United States Patent [19]

Wright et al.

[11] Patent Number: 4,477,536
[45] Date of Patent: Oct. 16, 1984

[54] PROCESS FOR PREPARING A MULTILAYER COATING

[75] Inventors: Howard J. Wright, Kansas City, Mo.; David P. Leonard, Overland Park, Kans.; Roger A. Etzell, Farmington Hills, Mich.

[73] Assignee: Glasurit America, Inc., Detroit, Mich.

[21] Appl. No.: 493,620

[22] Filed: May 11, 1983

Related U.S. Application Data

[60] Division of Ser. No. 359,307, Mar. 18, 1982, , which is a continuation-in-part of Ser. No. 256,959, Apr. 23, 1981, Pat. No. 4,377,661, and Ser. No. 297,631, Aug. 31, 1981, Pat. No. 4,414,357, each is a division of Ser. No. 98,115, Nov. 27, 1979, Pat. No. 4,290,932.

[51] Int. Cl.$^3$ .................. B32B 27/30; B05D 3/02
[52] U.S. Cl. .......................... 428/522; 427/407.1; 427/409; 428/458; 428/460; 428/461; 428/463; 428/483; 428/501
[58] Field of Search .................. 427/407.1, 409; 428/458, 461, 522, 463, 460, 483, 501

[56] References Cited

U.S. PATENT DOCUMENTS 4,220,679 9/1980 Backhouse .................. 427/401
4,403,003 9/1983 Backhouse .................. 427/407.1

*Primary Examiner*—Thurman K. Page
*Attorney, Agent, or Firm*—Wells & Wells

[57] ABSTRACT

Multilayer coatings having at least one base coating containing pigments and at least one transparent top coating are applied from coating compositions on the substrates and cured together. The coating composition contains:

(a) a film-forming synthetic resin;
(b) an organic solvent in which the synthetic resin is soluble; and
(c) polymer microparticles having polar and/or ionic groups on their surfaces and a diameter of about 0.01 to 5 microns obtained by emulsion polymerization of ethylene unsaturated monomers, these monomers having a portion comprising 2 or more double bonds per molecule and the microparticles are insoluble in the solution of (a) and (b).

The base coat(s) have (d) pigments and the top coats are free of pigments.

27 Claims, No Drawings

PROCESS FOR PREPARING A MULTILAYER COATING

CROSS-REFERENCE TO RELATED APPLICATIONS

This is a division, of application Ser. No. 359,307, filed Mar. 18, 1982, which is a continuation-in-part of copending U.S. patent application, Ser. Nos. 256,959 and 297,631, filed Apr. 23, 1981 and Aug. 31, 1981, respectively now U.S. Pat. Nos. 4,377,661 and 4,414,357, which in turn are divisional applications of U.S. patent application Ser. No. 98,115, filed Nov. 27, 1979, now U.S. Pat. No. 4,290,932.

BACKGROUND OF THE INVENTION

The field of the invention is combined coating processes and the invention is particularly concerned with preparing a multilayer coating consisting of at least one base coating containing pigments and at least one transparent top coating, the multilayer coating being applied to a substrate.

It is known to provide substrates with multilayer coatings as disclosed in U.S. Pat. Nos. 3,639,147 and 4,220,679, the disclosures of which are incorporated herein. Metal and plastic substrates are suitable for these multilayer processes. In particular, the present invention relates to a process for the deposition of a multilayer coating on automobile bodies or parts thereof which are made of metal or plastic and which as a rule are pretreated with a primer system. Until now, automobile bodies have been predominantly made of metal, however, bodies or parts thereof made of plastic are explicitly included herein as substrates.

Coatings deposited on substrates are both for protective and decorative purposes. The coating compositions used in the preparation of such coatings frequently contain pigments which improve the protective and decorative effect of the coatings. The term pigment herein means colored and hueless, organic and inorganic pigments, filler or dyestuffs which are soluble or insoluble in solvents or vehicles. Especially as regards automobile enameling, metallic pigments have for some time been widely used. They offer a varying reflection of incident light as a function of the angle of observation. This effect is frequently called the "flip-flop" effect and depends on the orientation of the flake-like metallic pigments in the finished coating.

Great efforts are exerted when making metallic-effect coatings that an optimal orientation of the metallic pigments be achieved. Until now, coating compositions based on acrylate polymers or polyesters containing hydroxyl groups have been used for such purposes in combination with the conventional crosslinking agents and in organic solvents containing cellulose esters, for instance cellulose acetobutyrate and other enameling accessories. These known coating compositions suffer from the drawback that their solid content is low and hence their organic solvent content is high. This is uneconomical and results in appreciable stress on the ecology. Another drawback is that the metallic pigments settle markedly and are difficult to stir again into the orginal state.

It has been proposed to solve the above cited problems by the use of microparticles in the coating composition. The term microparticles means polymer particles insoluble in a coating composition. U.S. Pat. No. 4,220,679 discloses a process for the preparation of a protective and/or decorative multilayer coating on a substrate, wherein the base coat deposited is a coating composition containing polymeric microparticles having a diameter of 0.01 to 10 microns. The microparticles are stably dispersed by a steric stabilization (steric barrier). The steric stabilization is implemented by polymer chains arranged around the particles and these polymer chains are solvated by the solvent of a film-forming polymer system. The microparticles therefore are provided with a shell or a boundary zone of polymer material anchored by primary and/or secondary valences to the particle core. Again, these coating compositions which are known from U.S. Pat. No. 4,220,679, tend to have strong settling of the metallic pigments, thereby degrading the metallic effect of the finished coatings.

SUMMARY OF THE INVENTION

Having in mind the limitations of the prior art, applicants have disclosed that coatings of improved decorative effectiveness are obtained, especially where metallic pigments are used, provided the coating composition contains special microparticles which are highly crosslinked and comprise polar groups on their surface. These special particles strongly delay or reduce settling, and even in the event of settling, the sediments which result are loose and easily stirred up.

An object of the present invention therefore is a process for preparing a multilayer coating wherein first the base coating is deposited in the form of a coating composition which contains:

(A) a film-forming synthetic resin;
(B) an organic solvent in which the synthetic resin is dissolved;
(C) microparticles having polar groups at their surfaces and having a diameter from about 0.01 to 5 microns prepared by emulsion-polymerizing ethylene-unsaturated monomers, at least a portion of which contains two or more double bonds per molecule, in an aqueous phase and with ensuing removal of the water from the aqueous phase and which are insoluble in the synthetic resin solution in the organic solvent and
(D) pigments. Next a coating composition is deposited as a transparent top coating of the multilayer coating and both compositions are hardened or cured together.

DESCRIPTION OF THE PREFERRED EMBODIMENTS

The film-forming polymer constituent (A) of the basecoat composition used in the first step of the process may be any of the polymers known to be useful in coating compositions. One suitable class of polymer consists of those which are derived from one or more ethylene unsaturated monomers. Particularly useful members of this class are the acrylic polymers which are well established for the production of coatings in the automobile industry, that is to say polymers or copolymers of one or more alkyl esters of acrylic acid or methacrylic acid, optionally together with other ethylene unsaturated monomers. These polymers may be of either the thermoplastic type or the thermosetting, crosslinking type. Suitable acrylic esters for either type of polymer include methyl methacrylate, ethyl methacrylate, propyl methacrylate, butyl methacrylate, ethyl acrylate, butyl acrylate and 2-ethylhexyl acrylate. Suitable other, copolymerizable monomers include vinyl acetate, vinyl propionate, acrylonitrile, styrene and vinyl toluene. Where the polymer is required to be of the crosslinking type, suitable functional monomers to be used in addition to the latter include acrylic acid, methacrylic acid, hydroxyethyl acrylate, hydroxyethyl methacrylate, 2-hydroxypropyl acrylate, 2-hydroxypropyl methacrylate, N-(alkoxymethyl) acrylamides and N-(alkoxymethyl) methacrylamides, where the alkoxy group may be, for example, a butoxy group, glycidyl acrylate and glycidyl methacrylate. The base-coat composition may in such a case contain also a crosslinking agent such as a diisocyanate, a diepoxide or, especially, a nitrogen resin, that is to say a condensate of formaldehyde with a nitrogeneous compound such as urea, thiourea, melamine or benzoguanamine, or a lower alkyl ether of such a condensate in which the alkyl group contains from 1 to 4 carbon atoms. Particularly suitable crosslinking agents are melamine-formaldehyde condensates in which a substantial proportion of the methylol groups have been etherified by reaction with butanol or alcohols like ethanol or methanol.

For the purposes of the foregoing general definition of the invention, the crosslinking agent, where present, is considered as being a part of the film-forming polymer (A).

The base-coat composition may incorporate a suitable catalyst for the crosslinking reaction between the film-forming polymer (A) and the crosslinking agent, for example an acid-catalyst compound such as acid butyl maleate, maleic acid, acid butyl phosphate or p-toluene sulphonic acid. Alternatively the catalytic action may be supplied by the incorporation of free acid groups in the film-forming polymer, for example by the use of acrylic acid or methacrylic acid as comonomer in the preparation of an acrylic polymer. Metal salts or combinations of metal salts and acids are suitable as catalysts. Again blocked catalysts, for instance acid amides, are also suitable.

The film-forming polymer may be prepared by solution polymerization of the monomer(s), in the presence of suitable catalysts or initiators such as organic peroxides or azo compounds, e.g. benzoyl peroxide or azodiisobutyronitrile. Conveniently the polymerization may be carried out in the same organic liquid that is to form the diluent constituent (B) of the base-coat composition, or in a liquid which is to form a part of that diluent. Alternatively the acrylic polymer may be prepared in a separate previous operation (e.g. by aqueous emulsion polymerization) and then dissolved in a suitable organic liquid.

Other suitable members of the class of polymer derived from ethylene unsaturated monomers are vinyl copolymers, that is to say copolymers of vinyl esters of inorganic or organic acids, for example vinyl chloride, vinyl acetate and vinyl propionate; the copolymers may optionally be partially hydrolyzed so as to introduce vinyl alcohol units. An example of such a copolymer is that containing 91% vinyl chloride, 6% vinyl alcohol and 3% vinyl acetate by weight.

Instead of being a polymer derived from ethylene unsaturated monomers, the polymer constituent (A) of the base-coat composition may be an alkyd resin or a polyester.

Such polymers may be prepared by condensation of polyhydric alcohols and polycarboxylic acids, with or without the inclusion of natural or synthetic drying oil fatty acids. Suitable polyhydric alcohols include ethylene glycol, propylene glycol, butylene glycol, 1,6-hexylene glycol, neopentyl glycol, diethylene glycol, triethylene glycol, tetraethylene glycol, glycerol, trimethylolpropane, trimethyolethane, pentaerythritol, dipentaerythritol, tripentaerythritol, hexanetriol, oligomers of styrene and allyl alcohol (for example that sold by Monsanto Chemical Company under the designation RJ 100) and the condensation products of trimethylolpropane with ethylene oxide or propylene oxide (such as the products known commercially as "Niax" triols). Suitable polycarboxylic acids include succinic acid (or its anhydride), adipic acid, azelaic acid, sebacic acid, maleic acid (or its anhydride), fumaric acid, malonic acid, itaconic acid, phthalic acid (or its anhydride), isophthalic acid, terephthalic acid, trimellitic acid (or its anhydride) and pyromellitic acid (or its anhydride). Where it is desired to produce air-drying alkyd resins, suitable drying oil fatty acids which may be used include those derived from linseed oil, soya bean oil, tall oil, dehydrated castor oil, fish oils or tung oil. Normally it is preferred that the oil length of such an alkyd resin should not exceed 50%. Alkyd resins with synthetic, non-drying fatty acids, for instance those prepared using the glycidylester of versatic acid (Cardura E-trade name of Shell Corp.) are also suitable. All these polyester and alkyd resins contain a proportion of free hydroxyl and/or carboxyl groups which are available for reaction, if desired, with suitable crosslinking agents as discussed above.

The polymer constituent (A) of the base coat composition may contain minor amounts of a cellulose ester, in particular cellulose acetate butyrate, depending on the requirements concerning the allowed amount of solvent in the base coat formulation.

Yet another type of polymer which may be employed as the constituent (A) comprises the nitrogen resins, which have already been described in the role of crosslinking agents for acrylic polymers of the thermosetting type. These same resins can be employed as film-forming materials in their own right and, for this purpose; the preferred resins are again melamine- or urea-formaldehyde condensates in which a substantial proportion of the methylol groups are etherified by reaction with butanol, methanol etc. In order to assist curing of the resin, there is preferably also incorporated into the base-coat composition a suitable catalyst, such as one of those already described. From what has been said above, it will be clear that there may also be employed as the film-forming constituent (A) a mixture of a thermosetting acrylic polymer and a nitrogen resin in such proportions that part of the latter functions as crosslinking agent and part as a supplementary film-former in its own right.

The volatile organic liquid constituent (B) of the base-coat composition may be any of the liquids, or mixtures of liquids, which are conventionally used as polymer solvents in coating compositions, for example aliphatic hydrocarbons such as hexane and heptane, aromatic hydrocarbons such as toluene and xylene, and petroleum fractions of various boiling point ranges which are predominantly aliphatic but have a significant aromatic content, esters such as butyl acetate, ethylene glycol diacetate and 2-ethoxyethyl acetate, ketones such as acetone and methyl isobutyl ketone, and alcohols such as butyl alcohol. The actual liquid or mixture of liquids selected as the diluent (B) will depend upon the nature of the film-forming polymer (A), according to principles which are well known in the coatings art, in order that the polymer shall be soluble in the diluent.

The microparticles (C) of the present invention are crosslinked particles and evince polar groups on their surfaces. These polar groups can be achieved for instance by polymerizing acrylate or methacrylate monomers having polar groups in an aqueous medium. Alternatively the polar groups of the microparticles (C) also may arise as polymer terminal groups from the dissociation of the polymerization initiator, for instance from the decay of potassium persulfate. They may also be obtained from the emulsifier added. This emulsifier for instance can be an unsaturated, water-soluble polyester which is copolymerized with the monomers and of which the carboxyl groups induce the electrostatic stabilization in the aqueous phase. It can also be apposed by means of secondary valences. The polar groups furthermore can be introduced by hydrolysis, for instance hydrolysis of ester groups, or they can be produced by subsequent reactions of addition to and at excess double bonds. Due to the high polarity of the aqueous medium, the polar groups arrange themselves in preferred manner on the particle surface, whereas non-polar groups preferredly are arranged in the particle core.

The microparticles so prepared then are transferred into the non-polar organic medium of the coating substance, as is explained more comprehensively further below. Care must be taken to prevent the polar groups from re-orienting themselves in the microparticle inner part, as in such an eventuality the microparticles become ineffective in the sense of the invention described. A high degree of crosslinking of the particles by means of polyfunctional monomers prevents this re-orientation of the polar groups when transferring the microparticles into an organic, non-polar medium, whereby polar groups are also present in the coating composition on the surface of the microparticles (C).

Because of the polar groups, there are interactions between the microparticles and a spatial lattice is formed. The interactions for instance may be due to dipole-dipole forces or hydrogen bridge bonds. Due to the interactions, a loose spatial lattice is formed between the particles in the coating substance, which can be reversibly dismantled by shearing forces. The loose lattice, i.e., gel structure renders the coating composition structurally viscous or thixotropic.

Controlling pigment settling in top coat enamels by the use of thixotropic agents is in fact known. However as regards metallic enamels, the conventionally used thixotropic agents such as Bentone pastes are inapplicable because in contrast to the microparticles described in the present invention, they do not improve the settling behavior of metallic pigments to the desired degree, rather they degrade the metallic effect and delay the physical drying of the base enamel.

In addition to the interactions between the microparticles, there are also interactions between the microparticles and the pigments. Frequently pigments themselves have polar groups on their surfaces, or are correspondingly pretreated. On account of the interactions between the microparticles and the pigments, settling of these pigments is prevented, and an improved effect is obtained in the finished coating. This applies especially to metallic enamels.

The preparation of the microparticles (C) is carried out by emulsion-polymerizing two or more ethylene-unsaturated monomers of which one preferably comprises a hydroxyl, carboxyl amide, epoxide or other such polar group and at least one is free from such groups. A further required constitutent is a polyfunctional crosslinking agent. Typically the monomer containing the —OH or —COOH group is acrylic acid, methacrylic acid, hydroxyethyl acrylate, hydroxypropyl acrylate, hydroxyethyl methacrylate or hydroxypropylmethacrylate. The ethylene unsaturated monomers which are free from —OH and —COOH groups may be, for example, the alkyl esters of acrylic or methacrylic acid, particularly those having from 1 to 4 carbons in the acrylate; and methyl, ethyl, propyl or butyl acrylate; and methyl, ethyl, propyl or butyl methacrylate. Other suitable monomers include styrene or alpha-methyl styrene.

The crosslinking agent may be any such agent which contains at least two ethylene unsaturated double bonds and will give a crosslinked polymer in aqueous emulsion polymerization that is insoluble in the organic solvent which is ultimately used to make up the acrylic resin compositions. As examples of suitable crosslinking agents there may be mentioned the following although it is noted that the invention is not limited thereto:

ethylene glycol dimethacrylate, tetraethylene glycol dimethacrylate, methylene bisacrylamide, methylene bismethacrylamide, divinyl benzene, vinyl methacrylate, vinyl crotonate, vinyl acrylate, divinyl acetylene, trivinyl benzene, glycerine trimethacrylate, pentaerythritol tetramethacrylate, triallyl cyanurate, divinyl ethane, divinyl sulfide, divinyl sulfone, hexatriene, triethylene glycol dimethacrylate, diallyl cyanamide, glycol diacrylate, ethylene glycol divinyl ether, diallyl phthalate, trimethylolpropane diallyl ether, divinyl dimethyl silane glycerol trivinyl ether, trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, tetraethylene glycol dimethacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexacrylate, tripentaerythritol octoacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol trisitaconate, dipentaerythritol pentaitaconate, dipentaerythritol hexaitaconate, 1,3-butanediol diacrylate, 1,3-butanediol dimethacrylate, 1,4-butanediol diitaconate, sorbitol triacrylate, sorbitol tetraacrylate, sorbitol tetramethacrylate, sorbitol pentaacrylate, sorbitol hexacrylate, modified 1,4-butylene diacrylate, 1,6 hexanediol diacrylate, modified trimethylolpropane triacrylate, modified pentaerythritol triacrylate, poly functional isocyanates with hydroxy monomers (isophorone diisocyanate plus hydroxy ethyl acrylate), methacrylated epoxy resin, and the like, and mixtures and prepolymers thereof.

The amount of ethylene unsaturated monomers used to make up the microgel can be widely varied. Typical amounts will fall in the range of 10–90% by weight of monomer or monomers containing —OH or —COOH groups and 90–10% by weight of monomer or monomers which are free from such groups.

The amount of crosslinking monomer that is used is important although this can be varied over a relatively large range. Desirably the amount of crosslinking monomer constitutes at least about 2% and up to 20% by weight of the total amount of all materials used for the emulsion polymerization. (The lower limit of 2% applies only to very effective crosslinking agents, for instance divinylbenzene.) In the normal situation this is roughly equivalent to a range of 5–70%, preferably 8–50%, by weight of the total weight of ethylene unsaturated monomers and crosslinking monomer.

Conventional emulsifiers or surfactants and initiators for emulsion polymerization are used to prepare the microgel emulsion. Typical emulsifiers (or surfactants) include such anionic alkali metal salts of organic carboxylic acids or soaps, e.g., potassium oleate or stearate. Alkyl sulfates and alkyl- or alkylarylsulfonates may also be used. Preferred for use are the sodium alkyl sulfosuccinamates or alkylarylsulfonates e.g., disodium N-octadecyl sulfosuccinamate, sodium diamyl octadecyl sulfosuccinamate, sodium diamyl sulfosuccinamate and sodium dodecylbenzene sulfonate. Advantageously, two or more such surfactants are used together since this seems to given an emulsion of better stability. Ionic and non-ionic emulsifiers may also be combined.

Suitable initiators are the free radical yielding peroxides and persalts e.g., benzoyl peroxide, lauroyl peroxide, ammonium, potassium or sodium persulfate, etc.

Advantageously the emulsion polymerization is carried out by adding the monomers gradually to heated water containing the emulsifier and initiator. Preferably the system is heated to, for example, 75°–90° C. during the monomer addition and for a short time afterwards although it will be appreciated that the polymerization conditions can be widely varied and will depend on other factors, e.g., the monomers involved. It is, in any case, important to obtain a stable emulsion in which the polymer particles have sizes of the order of about 0.01 to 5 microns, preferably 0.01 to 0.5 microns.

Therefore the aqueous microgel must be transferred into the organic medium of the coating composition. Basically two different procedures are suitable to this end. Either the microparticles can be separated from the aqueous emulsion, and this can be done by methods such as spray drying, centrifuging, salting out, freezing out, freeze-drying, and the separated microparticles are then added to a mixture of the remaining constituents of the coating composition, or else first the microgel is added to individual constituents of the coating composition.

In the second option for transferring the microparticles into the organic phase, the aqueous emulsion is added to a solution of the synthetic resin (A) in the organic solvent (B) or to individual constituents of the coating composition and thereupon the water is removed in part or in whole. It is possible also to add the aqueous emulsion to the initial materials for the preparation of the synthetic resin (A) and to prepare this synthetic resin in the presence of the microparticles.

In one illustrative procedure, the organic solvent (B) or an ingredient of the mixture of solvents used is added to the aqueous emulsion. The water than can be removed by azeotropic distillation, freezing-out or shake-out.

In the latter case the solvent may not be miscible with water, or only partly, and the microgel must migrate preferredly into the organic phase. A suitable organic solvent is n-butanol or a mixture of n-butanol and n-propanol.

If the aqueous microgel emulsion is azeotropically distilled any convenient organic solvent which forms an azeotrope with water may be used.

Typically suitable solvents include CELLOSOLVE ACETATE, butanol, naphtha, mineral spirits and the like. The amount of solvent used can be varied but should be enough to facilitate azeotropic removal of the water. All of the water of the microgel emulsion may be removed or only a portion thereof. Usually at least 50% by weight of the water should be removed. Alternatively the microparticles (C) can be precipitated from the aqueous emulsion using the solvent. The coagulate can be separated by filtering from the main quantity of water and can be further dried by azeotropic distillation, however, the coagulate may also float out of the aqueous phase, so that the main quantity of water can be merely drained off.

U.S. Pat. No. 4,220,679 does indeed disclose the possibility of preparing the microparticles by emulsion-polymerization in the aqueous phase; however, these microparticles are only weakly crosslinked, or not crosslinked at all, whereby any polar groups present when fed into a non-polar medium would reorient themselves and no longer be located on the particle surface. Moreover an accessory polymer is used as regards these known microparticles and in association with any polar groups that would have remained on the surfaces would build up a non-polar solvating envelope. This envelope provides then the steric stabilization considered to be necessary.

U.S. Pat. No. 4,220,679 therefore does not make it obvious to use microparticles with polar groups also fixed to their surfaces when in the organic medium of the coating substance and causing attractive interactions, rather it leads one skilled in the art away from the present invention because of its feature of steric stabilization which was explicitly held essential and mandatory.

The proportion of the microparticles (C) of the coating composition for the base coat advantageously amounts to 3 to 60% by weight referred to the sum of the synthetic resin (A) and the microparticles (C).

The pigment particles (D) included in the base-coat composition may range in size from 1 to 50 microns and may be of any of the pigments conventionally used in surface coating compositions, including inorganic pigments such as titanium dioxide, iron oxide, chromium oxide, lead chromate and carbon black, and organic pigments such as phthalocyanine blue and phthalocyanine green, carbazole violet, anthrapyrimidine yellow, flavanthrone yellow, isoindoline yellow, indanthrone blue, quinacridone violet and perylene reds. For the present purposes, the term "pigment" is here meant to embrace also conventional fillers and extenders, such as talc or kaolin.

The process of the invention is, however, of particular value in the case of base-coat compositions containing metallic flake pigmentation which are intended for the production of "glamour metallic" finishes chiefly upon the surfaces of automobile bodies as previously discussed. The presence of the polymer microparticles (C) in base-coats containing metallic pigmentation gives a valuable degree of improvement in metal control during the application of the base-coat and the subsequent application of the transparent top-coat. Suitable metallic pigments include in particular aluminum flake and copper bronze flake. In general, pigments of any kind may be incorporated in the base-coat composition in an amount of from 2% to 100% of the aggregate weight of the film-forming polyer (A) and the microparticles (C). Where metallic pigmentation is employed, this is preferably in an amount of from 5% to 20% by weight of the aforesaid aggregate weight.

Such pigments, whether metallic or otherwise, may be incorporated into the base-coat compositions with the aid of known dispersants. Thus, in the case where the main film-forming polymer is of the acrylic type, an acrylic polymer of similar composition may be employed as pigment dispersant. Any such polymeric dispersant is also considered to be part of the film-forming constituent (A).

The coating composition for the transparent top coat can be film-forming synthetic resin in an organic solvent. The synthetic resins described as component (A) are illustratively suitable for such application. The synthetic resin can be present in the solvent in dissolved or dispersed form.

The top coating also may be a coating composition corresponding to that of the base coat but contrary to latter being free of pigments. The top coat furthermore may be a pulverulent coating composition. These so-called power enamels can be applied by spraying electrostatically.

The process of the present invention is carried out so that first the coating composition is deposited on the base layer. Advantageously this coating composition is allowed to dry for a short time, whereby the organic solvent escapes at least in part and a film is formed which will not be degraded when subsequently the top coating is deposited. The drying may take place at room temperature, or higher temperatures may be applied. Thereupon the coating composition of the top layer is deposited and thereupon both coatings are hardened by baking. The baking temperature depends on the kind of coating composition used and is for instance about 100° to 140° C. The layer thickness of the base coating ordinarily is about 10 to 15 microns, that of the hardened top coating about 20 to 60 microns.

In a variation of the process described, two or more layers of the coating composition of the base or top coatings are deposited also in order to obtain a thicker layer and a better decorative effect and, better protection.

The present invention also applies to a coating composition for preparing coatings on substrates and containing:
(A) a film-forming synthetic resin;
(B) an organic solvent in which the synthetic resin is dissolved;
(C) microparticles comprising polar groups on their surfaces and prepared by emulsion-polymerizing ethylene-unsaturated monomers of which at least a portion comprises two or more double bonds per molecule in the aqueous phase and by subsequently removing the water, and which are insoluble in the solution of the synthetic resin in the organic solvent; and
(D) pigments.

The present invention furthermore is concerned with a substrate coated by a multilayer coating prepared by the process of the present invention.

The present invention is explained below in more detail in relation to specific examples.

EXAMPLE 1: PREPARING A MICROGEL EMULSION (A)

| Initial mixture 1: | |
|---|---|
| water | 1,568 g |
| sodium dodecylbenzene sulfonate | 10 g |
| Initial mixture 2: | |
| water | 792 g |
| sodium dodecylbenzene sulfonate | 18 g |
| hexanediol diacrylate | 347 g |
| methylmethacrylate | 277 g |
| hydroxypropylmethacrylate | 69 g |
| Initial mixture 3: | |
| water | 413 g |
| ammonium persulfate | 8.25 g |

The initial mixture 1 is filled into a reactor and heated to 80° C. After reaching this temperature, 15% of the initial mixture 2 is added with stirring and the temperature is raised again to 80° C. Thereupon 10% of the initial mixture 3 is added over 5 minutes. An exothermal reaction takes place. The temperature is kept at 80° C. for 15 minutes by cooling. Then the inital mixture 2 is uniformly added over 2 hours and the initial mixture 3 over 3 hours. Then the temperature is kept another hour at 80° C.

Care is taken during this preparation that the initial mixture 2 is steadily stirred within its supply vessel.

(B)

The microgel emulsion was then converted to a microgel dispersion in the following manner using:
66.6 parts of the microgel emulsion
16.7 parts of n-butanol
16.7 parts of methyl amyl ketone
The microgel emulsion is added to a five liter, three neck reaction flask equipped with a thermometer, an agitator and a Dean Stark water trap.

Under agitation the n-butanol is added to the microgel emulsion in the flask. Agitation is continued for ten minutes and then stopped. The n-butanol causes the acrylic microgel emulsion to coagulate and float to the surface. The bottom layer is removed from the reaction flask by suction. The methyl amyl ketone is then added to the flask to further dilute the acrylic microgel dispersion. The resulting mixture is heated to reflux and the residual water is removed through the Dean-Stark water trap. When the contents of the reaction flask reach 105° C., the contents are cooled and filtered. The resulting acrylic microgel dispersion exhibits the following characteristics:

| Nonvolatiles | 35.1% |
|---|---|
| Acid Number | 8.5 |
| Viscosity | 12 seconds #4 Ford Cup |
| Color | White |

EXAMPLES 2-3

(A)

Microgel emulsions II and III are prepared with materials as shown on Table I. The procedure for the preparation of these emulsions is as follows:

To a five liter, three neck reaction flask equipped with a condenser, thermometer and agitator, Aerosol 18, Aerosol AY-65, sodium bicarbonate and first deionized water are charged. The ammonium persulfate and second deionized water are premixed and added to a small addition funnel. The monomers are premixed and added to a separate addition funnel. The surfactants and water are heated to 87°±2° C. at which time 10% of the ammonium persulfate solution is added. The acrylic monomers are added to the reaction flask continuously over 2½ hours. At the same time, the remaining ammonium persulfate solution is added continuously over 3 hours. The temperature of the reaction is held at 87°±2° C. throughout the monomer addition. Thirty minutes after the ammonium persulfate solution is added, the emulsion is cooled to room temperature and discharged.

(B)

| ACRYLIC MICROGEL CONCENTRATE PREPARATION | |
|---|---|
| 17.67% | n-Butanol |
| 17.67% | Cellosolve Acetate (Union Carbide) |
| 12.32% | Microgel Emulsion |
| .36% | t-Butyl Perbenzoate (50% in Mineral Spirits) |
| 12.69% | Styrene |
| 11.66% | Butyl Methacrylate |
| 2.31% | n-Dodecyl Mercaptan |
| 9.75% | 2-Ethylhexyl Acrylate |
| 11.72% | Hydroxypropyl Methacrylate |
| .99% | Acrylic Acid |
| 2.31% | t-Butyl Perbenzoate (50% in Mineral Spirits) |
| .12% | t-Butyl Perbenzoate (50% in Mineral Spirits) |
| .43 | Cellosolve Acetate |

To a five liter, four neck reaction flask equipped with a condenser, Barrett water trap, thermometer and agitator, the n-butanol, Cellosolve Acetate, microgel emulsion and t-butyl perbenzoate are charged. The styrene, butyl methacrylate and n-dodecyl mercaptan are premixed and added to an addition funnel (Premix I). The 2-ethylhexyl acrylate, hydroxypropyl methacrylate, acrylic acid and second t-butyl perbenzoate are premixed and charged to a second addition funnel (Premix II). The solvents, emulsion and t-butyl perbenzoate are heated to reflux, approximately 95° C. When reflux is obtained, Premix I and II are added simultaneously and continuously over a four hour period of time. During the monomer addition water from the emulsion is continuously removed by azeotropic distillation through the Barrett trap. Immediately following the Premix I and II addition, a mixture of t-butyl perbenzoate and Cellosolve Acetate is added over one hour. The resin is allowed to reflux until all of the theoretical water is removed. This resin contains 10% microgel based on total resin solids. The physical characteristics of this resin are 58.3% non-volatiles, U viscosity and 31.7 acid number.

TABLE I

| Aerosol 18 * | 3.00 | 3.00 |
|---|---|---|
| Aerosol AY-65 ** | 1.50 | 1.50 |
| Sodium Bicarbonate | .25 | .25 |
| Deionized Water | 39.75 | 39.75 |
| Ammonium Persulfate | .25 | .25 |
| Deionized Water | 7.25 | 7.25 |
| Styrene | 11.975 | 11.55 |
| Butyl Methacrylate | 11.050 | 10.55 |
| 2-Ethylhexyl Acrylate | 9.125 | 8.65 |
| Hydroxypropyl Methacrylate | 11.050 | 10.55 |
| Acrylic Acid | .95 | .95 |
| Trimethylolpropane Triacrylate | 3.85 | 5.75 |
| TOTAL | 100.00 | 100.00 |

* Aerosol 18 (American Cyanamid) = Disodium n-octyldecyl - sulfo succinate
** Aerosol AY-65 (American Cyanamid) = sodium diamyl sulfo succinate

EXAMPLE 4

(A)

| MICROGEL EMULSION PREPARATION | |
|---|---|
| .275% | Aerosol MA-80 (American Cyanamid) = Sodium dihexyl sulfo succinate |
| 52.150 | Deionized Water |
| .250% | Ammonium persulfate |
| 4.475 | Deionized Water |
| 8.400% | Methyl methacrylate |
| 2.100% | Hydroxypropyl methacrylate |
| 10.000% | 1,6-Hexanediol diacrylate |
| .250% | Aerosol MA-80 |
| .600% | Aerosol 22 (American Cyanamid) = tetra sodium N—(1,2 - dicarboxy-ethyl) N—Octadecyl sulfo succinate |
| 21.500% | Deionized Water |

Procedure:

To a five liter, three neck reaction flask equipped with a condenser, thermometer and agitator, charge the first Aerosol MA-80 and deionized water. Premix the ammonium persulfate and second portion of deionized water and charge to a small addition funnel. A premix of methyl methacrylate, hydroxypropyl methacrylate, 1,6-hexanediol diacrylate, Aerosol MA-80, Aerosol 22, and the third portion of deionized water is prepared and charged to a second addition funnel. This monomer pre-emulsion is held under constant agitation to maintain a uniform mixture. The contents of the reaction flask are heated to 80°±2° C. at which time 10% of the ammonium persulfate solution is added. The monomer preemulsion and 80% of the ammonium persulfate solution are added simultaneously and continuously over 2½ hours. The remaining 10% of the ammonium persulfate solution is added over the next 20 minutes. The emulsion is held ½ hour, cooled, and discharged from the flask.

(B)

| ACRYLIC MICROGEL RESIN PREPARATION | |
|---|---|
| 23.08% | Microgel emulsion (A) |
| 5.79% | n-Butanol |
| 14.40% | Cellosolve Acetate |
| 11.71% | n-Butanol |
| .59% | t-Butyl peroctoate |
| 1.42% | n-Dodecyl mercaptan |
| 3.69% | Styrene |
| 9.57% | Butyl methacrylate |
| 7.69% | Methyl methacrylate |
| 8.96% | 2-Ethylhexyl acrylate |
| 7.96% | Hydroxyethyl acrylate |
| 0.81% | Acrylic acid |
| 3.78% | t-Butyl peroctoate |
| .19% | t-Butyl peroctoate |
| .36% | Cellosolve Acetate |

In a separatory funnel, equipped with an agitator, charge the microgel emulsion and first n-butanol. Agitate vigorously for five minutes. Allow the mixture to separate into the organic layer and the water n-butanol layer. Discard the water layer and charge the organic layer to the five liter reaction flask.

This coagulated and concentrated emulsion can be used in place of the raw emulsion. The remaining procedure is the same as that used in 2-B.

EXAMPLES 5 THROUGH 8: PREPARING THE BASE-LAYER COATING COMPOSITIONS

The microgel/synthetic-resin preparations prepared per examples 1 through 4 (microgel concentrates) were processed as follows into coating compositions:

20.6 kg of a solution of an acrylate resin consisting of 25 parts by weight of styrene, 53 parts by weight of butylmethacrylate, 20 parts by weight of hydroxyethylacrylate and 2 parts by weight of acrylic acid and placed in methylamyl ketone. The solution has a Gardner-Hold viscosity of H-K for a solid content of 60% by weight. With stirring, the following ingredients are slowly added: 30.1 kg of the above described microgel concentrates, 9.1 kg of a mixture of 80 parts by weight of Cellosolve acetate and 20 parts by weight of cellulose acetate butyrate, 16.8 kg of a butanol-etherified melamineformaldehyde resin, 4.0 kg of ethanol, 2.9 kg of xylene. After thorough mixing, a mixture of 8.2 kg of aluminum pigment, 0.1 kg of lecithin and 8.2 kg of xylene is added. The total mixture is dispersed with a paint mixer. Four coating compositions for the base layer are obtained.

Together with a mixture of equal parts of xylene and acetone, the coating compositions are set to a spray viscosity of 25 sec. in a #4 Ford cup. These coating compositions are used to coat phosphatized and steel sheets covered with an electric immersion primer by means of the spray process. After a ventilation time of about 2 minutes, a transparent, unpigmented coating substance is deposited. This coating composition is of the following composition: 53.9 parts by weight of a solution of an acrylate resin which is a copolymer of 25 parts by weight of styrene, 53 parts by weight of butylmethacrylate, 20 parts by weight of hydroxyethylacrylate and 2 parts by weight of acrylic acid, 28.7 parts by weight of a butanol-etherified melamineformaldehyde, 0.2 parts by weight of Modaflow, 4.0 parts by weight of ethanol and 13.2 parts by weight of a mixture of light-stabilizer (Sanduvor of Sandoz A.G., Basel, or Tinuvin of Ciba-Geigy A.G., Basel) and xylene in the ratios 2:2.

The panels so coated are baked for 20 minutes at 130° C. Coating with an excellent metallic effect is obtained.

CONTROL EXAMPLE

A base enamel free of microparticles is prepared as follows to act as a control:

38.7 kg of a solution of an acrylate resin that is a copolymer of 25 parts by weight of styrene, 53 parts by weight of butylmethacrylate, 20 parts by weight of hydroxyethylacrylate and 2 parts by weight of acrylic acid are placed in methylamyl ketone. The solution evinces a Gardner-Hold viscosity of H-K and a solid content of 60% by weight. With stirring, the following ingredients are slowly added: 9.1 kg of a mixture of 80 parts by weight of Cellosolve Acetate and 20 parts by weight of cellulose acetatebutyrate, 16.8 kg of a butanoletherified melamineformaldehyde resin, 4.0 kg of ethanol, 2.9 kg of xylene, 6.0 kg of Cellosolve acetate and 6 kg of n-butanol. After thorough mixing, a mixture of 8.2 kg of alumuninum pigment, 0.1 kg of lecithin and 8.2 kg of xylene is added. The total mixture is dispersed with a paint mixer.

The coating composition is set to a spray viscosity of 25 sec. in a #4 Ford cup by means of a mixture of equal parts of xylene and acetone. Phosphatized and electroimmersion primed steel sheets are coated with these coating compositions by the spray method. After a ventilation time of about 2 minutes, the same transparent, unpigmented coating composition as in examples 5 through 8 is deposited.

The panels so coated also are baked for 20 minutes at 130° C. Coatings with a less satisfactory metallic effect are obtained.

In a further control example, the coating compositions prepared per examples 5 through 8 and those per the control example are let stand at room temperature for 4 weeks. After that period of time, the sediments are stirred up in all examples. It is found that the coating compositions of the present invention can be easily stirred up, whereas the coating substance lacking microparticles evinced a hard sediment.

Thereupon metal panels were again coated and baked in the above described manner. The coating compositions of the present invention again provide the same good results as described before, whereas the controls evince a very bad and uneven metallic effect.

We claim:

1. A process for preparing a multilayer coating on a substrate consisting of at least one base coating containing pigments on said substrate and at least one transparent top coating on said base coating with improved pigment settling on storage of said base coating material, and excellent pigment orientation in said multilayer coating, comprising:
    (1) applying a coating composition as said base coating consisting essentially of
        (a) 10 to 60% by weight of a film-forming synthetic resin;
        (b) 40 to 80% by weight of an organic solvent in which said synthetic resin is soluble;
        (c) 2.5 to 25% by weight of polymer microparticles having ionic or a mixture of polar and ionic groups on their surfaces and having a diameter of 0.01 to 5 microns prepared by emulsion-polymerizing ethylene-unsaturated monomers in an aqueous phase, at least one of said monomers selected from the group consisting of acrylic acid, methacrylic acid, and substituted alkyl esters thereof and containing a polar functional group and at least another of said monomers selected from the group consisting of an alkyl ester of acrylic acid, an alkyl ester of methacrylic acid, styrene and methyl styrene, said another of said monomers free of polar functional groups and a multi-functional crosslinking agent present in an amount of 5 to 70% by weight of the total weight of said ethylenically unsaturated monomers and said crosslinking agent, said crosslinking agent crosslinking said microparticles to a degree that said polar and said ionic groups are fixed on the surface of said microparticles, and subsequently removing water from said aqueous phase, said microparticles being insoluble in the solution of said synthetic resin in said organic solvent, and having said polar and ionic groups fixed on the surfaces, rearrangement of said polar and ionic groups into the particle interior being prevented by the crosslinking from said crosslinking agent; and (d) 2 to 40 weight percent pigments (2) applying said transparent top coating on said base coating; and (3) curing (1) and (2) together to form a crosslinked transparent top coat film upon a base coat film.

2. The process of claim 1, wherein said microparticles (c) are prepared in the form of an aqueous dispersion, and as such are added to a solution of said synthetic resin (a) in said organic solvent (b) and thereupon water from said aqueous dispersion is removed by azeotropic distillation.

3. The process of claim 1, wherein said microparticles (c) are prepared by spray drying, freeze drying, centrifuging, salting out or freezing out of the aqueous phase and thereupon are added to a solution of said synthetic resin (a) in said solvent (b).

4. The process of claim 1, wherein said microparticles (c) are obtained in the form of an aqueous dispersion and as such are added to the components for the preparation of said synthetic resin (a), said synthetic resin (a) is prepared in the presence of said microparticles (c) and water is removed from said aqueous dispersion by azeotropic distillation during the preparation of said synthetic resin (a).

5. The process of claim 1, wherein said synthetic resin (a) is a homo- or co-polymer prepared by polymerizing ethylene-unsaturated monomers having at least a portion of said synthetic resin as alkylesters of acrylic or methacrylic acid.

6. The process of claim 1, wherein said synthetic resin (a) is an alkyd resin or a polyester resin.

7. The process of claim 1, wherein said synthetic resin (a) is an aminoplastic resin.

8. The process of claim 1, wherein said microparticles (c) are prepared by homo- or co-polymerizing ethylene-unsaturated monomers having at least a portion of alkylesters of acrylic or methacrylic acid.

9. The process of claim 1, wherein said top coating is applied as a film-forming synthetic resin in an organic solvent.

10. The process of claim 1, wherein said top coating is deposited in the form of a coating composition containing:

(a) a film-forming synthetic resin;

(b) an organic solvent in which said synthetic resin is soluble; and (c) polymer microparticles having polar, ionic or a mixture of polar and ionic groups on their surfaces and having a diameter from about 0.01 to 5 microns prepared by emulsion-polymerizing ethylene-unsaturated monomers, said monomers having one portion comprising 2 or more double bonds per molecule, in an aqueous phase and by subsequent removal of water from said aqueous phase, and said microparticles being insoluble in the solution of said synthetic resin in said organic solvent.

11. The process of claim 1, wherein said top coating is a pulverulent coating composition.

12. The process of claim 1, wherein said pigments (d) are metallic pigments.

13. The process of claim 1, wherein the concentration of said microparticles (c) in said coating composition amounts to about 2–60% by weight referred to the total weight of said synthetic resin (a) and said microparticles (c).

14. A coated substrate having a multilayer coating thereon prepared by the process of claim 12.

15. The process of claim 1, wherein said polymer microparticles have a diameter of 0.05 to 0.5 microns.

16. The process of claim 1, wherein said polar functional groups are selected from hydroxy groups, tertiary amine, and sulfonic acid groups.

17. The process of claim 16, wherein the amount of ethylenically unsaturated monomer containing said hydroxy, tertiary amine or sulfonic acid groups used in the preparation of the polymeric microparticles ranges from 10 to 50 weight percent and the amount of said ethylenically unsaturated monomer free from said hydroxy, tertiary amine or sulfonic acid groups ranges from 70 to 10 percent by weight of the total weight of said ethylenically unsaturated monomers and crosslinking agent.

18. The process of claim 1, wherein the amount of the multifunctional crosslinking agent used for the preparation of the polymer microparticles amounts to 10 percent to 50 percent by weight of the total weight of ethylenically unsaturated monomers and crosslinking agent.

19. The process of claim 1, wherein the concentration of said microparticles (c) in said base coat composition amounts to about 5 to 50 percent and preferably 10 to 35 percent by weight referred to the total weight of said synthetic resins (a) and said microparticles (c).

20. The process of claim 1, wherein said film-forming synthetic resins (a) are a combination of an aminoplast resin and a copolymer of a mixture of ethylenically unsaturated monomers, at least one of said monomers selected from the group consisting of acrylic acid, methacrylic acid, a substituted alkyl ester of acrylic acid containing a free hydroxy group, a substituted alkyl ester of methacrylic acid containing a free hydroxy group, a substituted alkyl ester of acrylic acid containing a free epoxy group and a substituted alkyl ester of methacrylic acid containing a free epoxy group and at least another of said monomers selected from the group consisting of unsubstituted alkyl ester of acrylic acid, unsubstituted alkyl ester of methacrylic acid, styrene and methyl styrene aminoplast resin to copolymer being from 50:50 to 16:84 weight percent.

21. The process of claim 1, wherein said film-forming synthetic resins (a) are a combination of an aminoplast resin and a second resin selected from the group consisting of alkyd resins and polyester resins and the weight ratio of aminoplast resin to said second resin is from 50:50 to 16:84.

22. The process of claim 1, wherein said transparent coating is deposited in the form of a coating composition containing:

(a) film-forming synthetic resins; and (b) organic solvents.

23. The process of claim 22, wherein said film-forming synthetic resins are a combination of a thermosetting acrylic copolymer and an aminoplast resin.

24. The process of claim 22, where said film-forming resins are a combination of an alkyd resin and a second resin selected from the group consisting of polyester resins and aminoplast resins.

25. The process of claim 22, where said film-forming resins are a combination of an alkyd resin and a second resin selected from the group consisting of polyester resins, thermosetting acrylic copolymers, and aminoplast resins.

26. The process of claim 22, wherein said transparent coating is deposited in the form of a coating composition consisting essentially of
(a) film-forming synthetic resins;
(b) organic solvents; and
(c) polymeric microparticles having a diameter of 0.01 to 5 microns, prepared by emulsion polymerization in water of a mixture of ethylenically unsaturated monomers, at least one of said monomers selected from the group consisting of acrylic acid, methacrylic acid, and substituted alkyl esters thereof and containing polar functional groups and at least another of said monomers being selected from the group consisting of alkyl esters of acrylic acid, alkyl esters of methacrylic acid, styrene and methyl styrene and being free of polar functional groups, and a multifunctional crosslinking agent present in an amount of at least 5 and up to 50 percent by weight of the total weight of said ethylenically unsaturated monomers and crosslinking agent, and by subsequent removal of water from said aqueous phase, said microparticles being insoluble in the solution of said synthetic resin in said organic solvent.

27. The process of claim 26, wherein the concentration of said microparticles in said transparent top coating composition amounts to from 2 to 15 percent by weight referred to the total weight of said synthetic resins and microparticles.

* * * * *